United States Patent [19]

Entner

[11] 3,794,988

[45] Feb. 26, 1974

[54] PROGRAMMABLE ELECTROMAGNETIC LOGIC

[76] Inventor: Ronald S. Entner, 8148 Lake Park Dr., Alexandria, Va. 22309

[22] Filed: July 22, 1969

[21] Appl. No.: 846,299

[52] U.S. Cl.................340/174 TF, 340/174 QA, 340/174 ZB, 307/88 LC

[51] Int. Cl........................................... G11c 11/14

[58] Field of Search............340/174 TF, 174 FB; 307/88 LC

[56] References Cited

UNITED STATES PATENTS 3,161,862 12/1964 Williams ............................ 340/174
3,438,006 4/1969 Spain ................................ 340/174

FOREIGN PATENTS OR APPLICATIONS 982,677 2/1965 Great Britain ...................... 340/174

OTHER PUBLICATIONS

Spain et al., Controlled Domain Tip Propagation, Part II, Journal of Applied Physics, Vol. 37, pp. 2,584–2,593, June 1966.

*Primary Examiner*—Maynard R. Wilbur
*Assistant Examiner*—N. Moskowitz
*Attorney, Agent, or Firm*—R. S. Sciascia; P. Schneider; T. V. Vezeau

[57] ABSTRACT

Performance of logic functions disclosed is accomplished by a thin film programmable configuration that can be programmed to function either as an AND or an OR gate. The arrangement of a plurality of these logic structures into a matrix configuration is accomplished by the use of a thin film technology. The very simple basic thin film logic device is not restricted to use in a matrix configuration but, may be used in any suitable configuration or manner that is especially adaptable to thin film construction.

15 Claims, 10 Drawing Figures

BY

INVENTOR
RONALD S. ENTNER
BY Thomas O. Watson Jr.
ATTORNEY

PROGRAMMABLE ELECTROMAGNETIC LOGIC

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to logic devices and, more particularly, to thin film magnetic logic devices that can be programmed to function either as an AND or an OR gate. In current digital computer designs there often exists a significant difference between the memory component and logic component technologies employed. This is due in part to the high cost of fabricating semiconductor memories when compared with magnetic memories. This division results in computers that devote a good portion of their operating time transferring data between logic and memory circuits. If a low cost magnetic memory could be designed to perform certain logic functions, an increase in computer operating speed could be affected with no increase in total system cost.

Prior art thin film logic devices that have addressed themselves to the above-stated problem leave room for development in the area of practicability and operating efficiency. Thin film logic circuits utilizing strips of thin magnetic film surrounded by single turn coils have been devised to perform the basic binary logic functions of an AND or an OR gate and the basic logic functions of inhibit and transform. These devices utilize a multitude of current-carrying conductors interconnecting various separate thin film strips which are mounted on a substrate. This type of structure inherently gives rise to the problem of magnetic interconnection which is undesirable and sometimes ineffectively controlled by the use of artificially induced buffer zones. Other devices which address themselves to the problem of magnetic data storage and logic systems propose to use the creation and movement of domain walls, such as the Block and Neil walls, to perform the desired logic functions. However, it was found that the movement of domain walls within a thin film magnetic material is rather difficult to handle because of its very small size relative to the domain itself. Furthermore, the speed at which a domain wall moves along a thin film magnetic strip is so rapid, its orientation by electronic pulsing and sensing circuitry becomes extremely difficult.

SUMMARY OF THE INVENTION

This invention utilizes the mechanism of creating and destroying magnetic domains within a thin film soft magnetic strip by means of current-carrying conductors acting in conjunction with magnetic domains in the thin film material. By means of this mechanism, a shifting arrangement is effectuated which also facilitates tangential interaction between magnetic domains giving rise to the possibility of an AND or an OR logic device. The writing of a predetermined code into the logic device of the instant invention programs it so that it will perform either as an AND or an OR gate.

OBJECTS OF THE INVENTION

An object of the present invention is to provide a programmable thin film magnetic device for performing logic functions.

Another object of this invention is to provide a programmable thin film magnetic device which can be programmed to perform either one of two logic functions.

A still further object of the invention is to provide a programmable thin film magnetic device in which the mechanism of programming the device can also function as the mechanism of readout for the device.

A still further object of this invention is to provide a programmable thin film magnetic device which can function as the sole building block in the construction of a complex logic circuit.

Still another object of this invention is to provide a programmable thin film magnetic device which performs as the major building block of a complex logic circuit which facilitates shifting of data in either of two opposed directions through the complex logic circuit.

Other objects, advantages and novel features of the invention will become apparent from the following detailed description of the invention when considered in conjunction with the accompanying drawings.

DESCRIPTION OF THE PREFERRED EMBODIMENTS

In discussing the preferred embodiments of this invention, reference will be made to the presently known theoretical concepts which tend to explain the operation of the invention. However, it should be understood that other and equally plausible explanations of the operation of this invention exist. Therefore, it is to be understood that Applicant does not wish to be limited to the one theory of operation herein presented to explain the operation of his invention.

Figure 1:
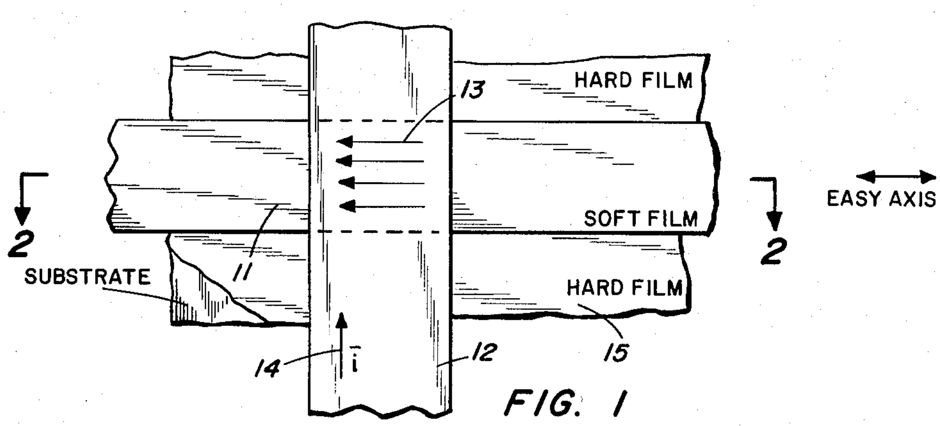
FIG. 1 is a top schematic view illustrating the principle on which the instant invention is based.

Referring now to FIG. 1, a top view of a soft film magnetic strip 11 deposited by means of electrodeposition techniques onto the hard magnetic film 15 is illustrated. FIG. 1 further illustrates a current-carrying winding 12, carrying current 14, placed over the soft and hard films by means of photoetching techniques or electrodeposition techniques that are well known in the art. The direction of current 14 through the current strip 12 creates an electromagnetic field about the conductor 12 in the direction illustrated by the arrows 13. This electromagnetic field creates a magnetization state in the soft film 11 which is oriented in the direction shown by the arrows 13.

Figure 2:
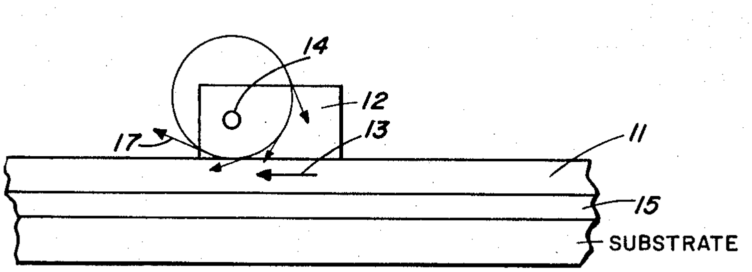
FIG. 2 is a cross-sectional schematic view taken along cross-sectional line 2—2 which illustrates the principle on which the invention is based.

As can be seen in FIG. 2, the current, through current-carrying strip 12, creates a magnetic field of a certain flux density about current strip 12, as illustrated by vectors 17, so as to induce a magnetization state in the direction of arrows 13 in the soft film 11.

The soft magnetic material utilized is of a type possessing a uniaxial anisotropic characteristic and having a small remanence and coercive force and a small, not very pronounced, hysteresis loop. The hard film 15 utilized in the structure is a type of material characterized by a very pronounced hysteresis loop with large remanence and large coercive forces. These enumerated qualities of the hard film serve to limit the domain creation within the area of the soft film strip by causing the hard film to act as an energy barrier for the domains and domain wall spikes created. The respective layers of hard and soft magnetic film, along with the current-carrying strip 12, can be mounted on a suitable substrate material.

Figure 3:
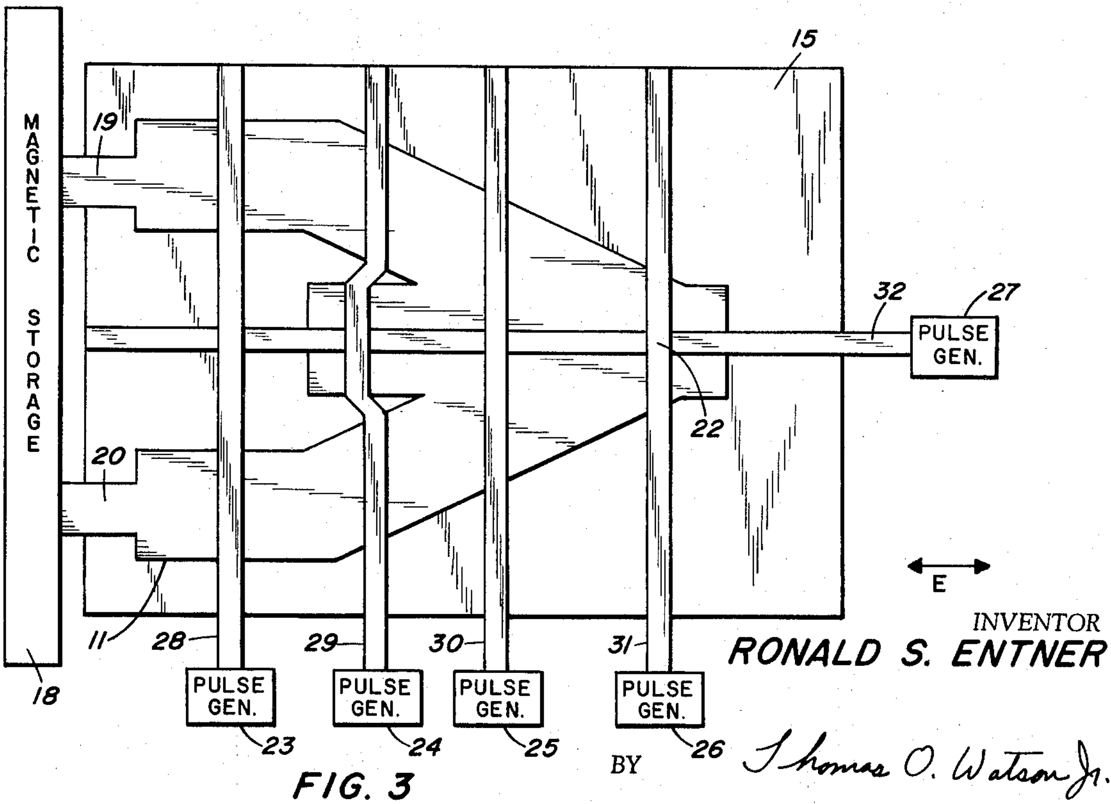
FIG. 3 is a schematic illustration of one embodiment of the invention.

Referring now to FIG. 3, there is illustrated one embodiment of the invention, a basic logic device having a construction commensurate with the principle illustrated in FIGS. 1 and 2. Configuration 11 of FIG. 3 is constructed of soft film material. Magnetic storage unit 18, which can be any well-known magnetic unit such as, for example, a magnetic shift register, introduces a domain oriented to represent a 1 or a 0 into the inputs of logic device 11. Strip conductor 28 facilitates the shifting of the domain introduced by magnetic storage device 18. Boxes 23, 24, 25 and 26 are representative of well-known electronic equipment for producing pulse sequences in a timed and desired order. Box 27 connected to conductor 32 is representative of electronic equipment well known in the art which can both produce pulses and detect induced current in conductor 32. Strip conductor 32 is known as the read-write conductor and works in conjunction with conductor 28 and the other conductors in parallel with conductor 28 to create and detect domains along the configuration of the thin film magnetic strip 11. The arrow labeled E in FIG. 3 is representative of the direction of the easy axis of magnetization for the soft thin film magnetic material.

Figure 4:
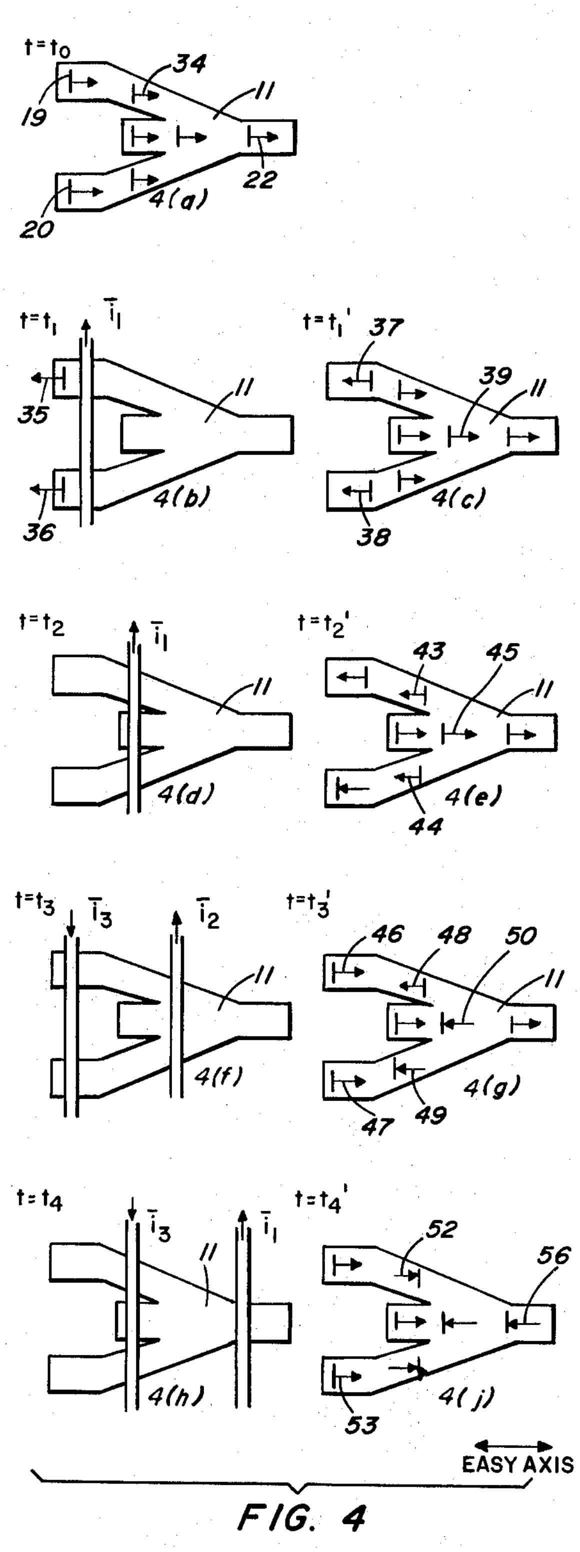
FIGS. 4(*a*)–(*j*) are schematic illustrations of the AND operation of the instant invention.

Referring now to FIG. 4, there is shown a schematic and vector illustration of the operation of the embodiment of FIG. 3 as an AND gate. Initially, the entire soft thin film magnetic structure 11 bounded by hard film magnetic structure 15 is saturated so as to align all the magnetic domains within the soft thin film material in the direction indicated by the magnetization vectors 34. Assuming that the magnetic storage device 18 of FIG. 3 introduces into the input legs of the magnetic logic device two domains 35 and 36, as illustrated in FIG. 4*b*, the situation is then analogous to an introduction of an information bit having a value of 1 at each input of an AND gate. Generating a pulse current through strip conductor 28 of FIG. 3 in the direction indicated by $I_1$ in FIG. 4(*b*) will create a local magnetic field about conductor 28 which is in a direction symphathetic to the domains 35 and 36. Because of the tangential interaction between the applied field of conductor 28 and the domains 35 and 36, a new domain is created underneath conductor 28 which is essentially defined by the soft film, magnetic configuration, as shown in FIG. 4(*c*) as 37 and 38. FIG. 4(*d*) illustrates a current pulse being passed through conductor 29 of FIG. 3 which has the same magnitude as was passed through conductor 28. Because of the tangential interaction between the domains 37, 38 and the applied field, domains 43 and 44 are created as shown in FIG. 4(*e*).

It may perhaps be desirable at this point to explain that the magnitude and direction of pulse current $I_1$ is chosen so as to be in a direction which will create a reverse domain with reference to the initial saturation direction of the soft film material 11. The amplitude of $I_1$ being insufficient to nucleate a reverse domain by itself is sufficient when working in conjunction with a sympathetic domain contiguous with the current-carrying strip conductor to nucleate a domain beneath the current-carrying conductor.

FIG. 4(*f*) illustrates that a current $I_3$ of sufficient magnitude and of opposite direction may be passed through conductor 28 of FIG. 3, as shown in FIG. 4(*f*), causing the nucleated domains 37 and 38 to revert back to their initial orientation, as illustrated by 46 and 47 in FIG. 4(*g*). A current $I_2$ is passed through conductor 30 of FIG. 3, as illustrated in FIG. 4(*f*), and is of such a magnitude that it requires two contiguous domains working in conjunction with the field applied by current $I_2$ to nucleate a domain 50 of FIG. 4(*g*). Because the domains 48 and 49 are sympathetic to the direction of the applied field created by current $I_2$, the domain 50 was created. FIG. 4(*h*) illustrates that a current $I_3$ may be passed, in the direction indicated to cause the domains 48 and 49 to revert to their initial orientation, as illustrated in FIG. 4(*j*) as 52 and 53. A current $I_1$ in the direction shown in FIG. 4(*h*) is passed through conductor 31 and is of such a magnitude as to nucleate in conjunction with domain 50 a domain 56 as shown in FIG. 4(*j*).

Figure 5:
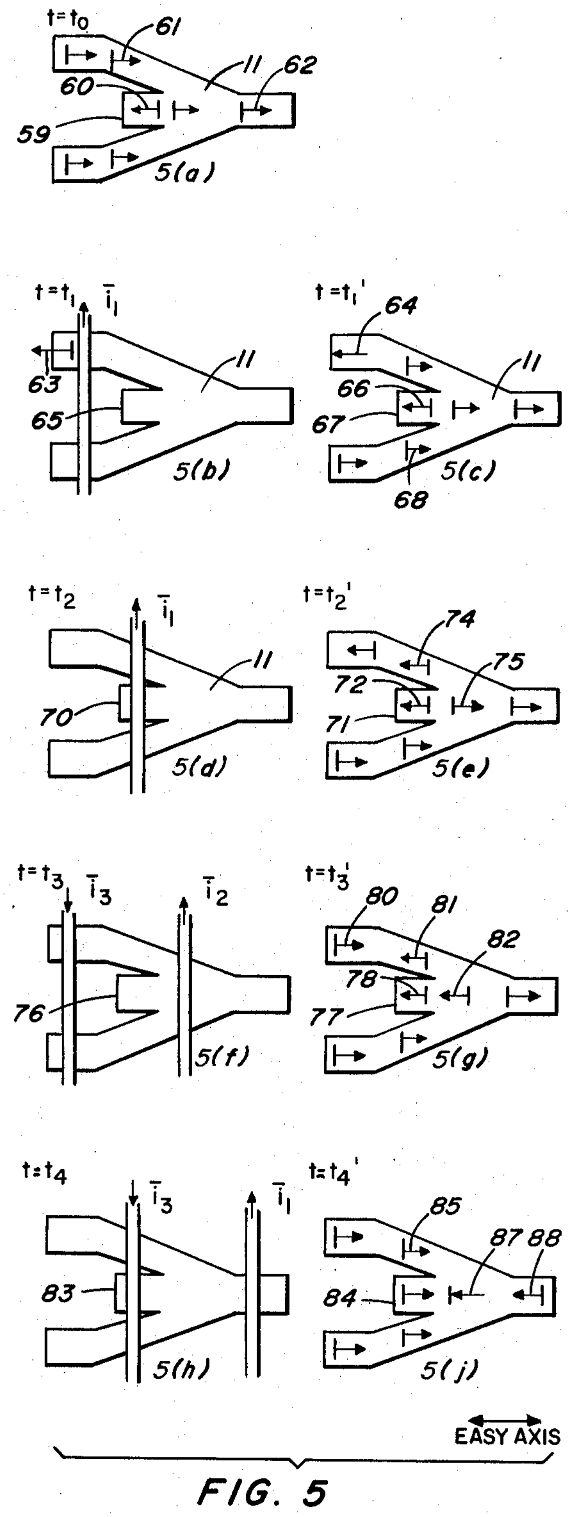
FIGS. 5(*a*)–(*j*) are schematic illustrations of the OR operation of the instant invention.

Referring now to FIG. 5, a graphical and vector representation of the operation of the embodiment of FIG. 3 as an OR gate is shown. The initial state, as illustrated in FIG. 5(*a*), of the soft film magnetic material 11, must have written into the tab 59 a domain 60 which is in an opposite orientation to the other domains within the thin film structure and which effectively represents an information bit of value 1. This domain may be written into the tab by a process explained later in connection with the write operation function of the invention. Or, it may be permanently written into the OR tab 59 by using a small piece of hard magnetic film for the OR tab which has within it a domain oriented in the desired direction. FIG. 5(*b*) illustrates that a domain has been introduced into one leg of the logic device by the magnetic storage 18 of FIG. 3. Passing a current through conductor 28 in a direction which creates a magnetic field sympathetic to the orientation of magnetic domain 61, creates magnetic domain 64. The state of magnetization of the logic configuration at this point is illustrated in FIG. 4(*c*). FIG. 5(*d*) illustrates passing a current $I_1$ through conductor 29 in such a direction as to be sympathetic with the orientation of domain 64. As shown in FIG. 5(*e*), a domain 74 is created. If desired, a current 13 shown in FIG. 5(*f*) is passed through conductor 28 in a direction which will cause the erasure of domain 64 and cause that area of the thin film magnetic strip to revert back to its initial state of magnetization, as illustrated by domain 80 in FIG. 5(*g*). Current $I_2$ when passed through conductor 30, nucleates domain 82, as illustrated in FIG. 5(*g*) because of the interaction of the magnetic domains 81 and 78 with the applied field created by the current pulse through conductor 30. FIG. 5(*h*) illustrates the erasure of the domains 81 and 78. The passing of a current through conductor 31, as previously noted, shifts domain 87 by creating a domain 88, as illustrated by FIG. 5(*j*).

As can be seen from the above explanation of the AND and OR operation of one embodiment of this invention, the soft film magnetic configuration functions as an AND gate if no information bit of value 0 is written into its OR tab. On the other hand, if an information bit of value 1 is written into its OR tab it will function as an OR gate.

Figure 6:
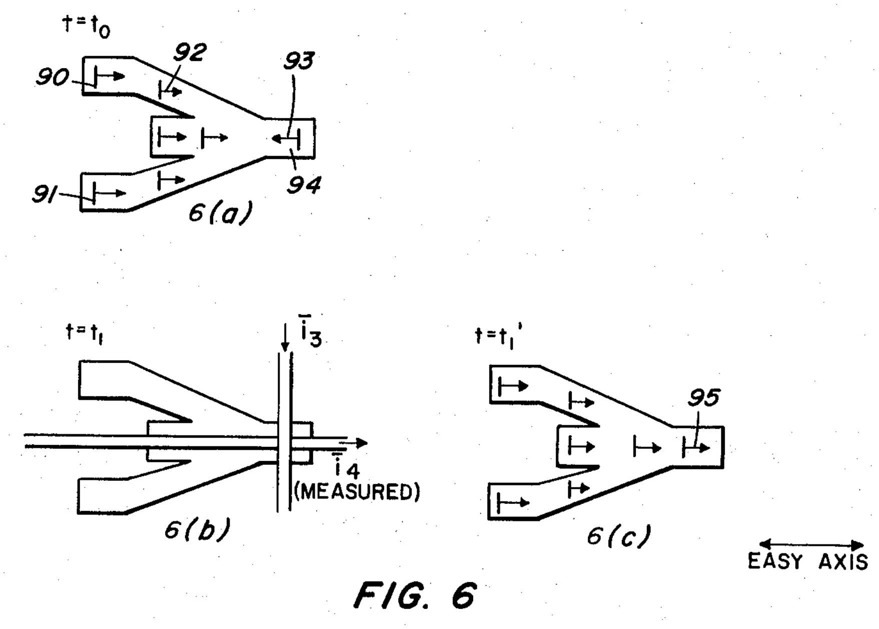
FIGS. 6(*a*)–(*c*) are schematic illustrations of the "read" operation of the invention.

Referring now to FIG. 6 which illustrates the read operation of the invention, we assume that a domain 93 is orientated in the direction indicated in FIG. 6(*a*) and it is desired to read or detect whether or not a domain representing a bit of value 1 is located underneath conductor 31 of the embodiment shown in FIG. 3. The read operation is accomplished by passing a current in the direction indicated by $I_3$ through conductor 31 of FIG. 3 which causes the domain 93 to rotate and align itself in the direction indicated by the other domains 92. This direction of alignment is the initial state of the soft film magnetic material. Because of the rotation of the magnetic domain, a current is induced in conductor 32 of FIG. 3 in the direction of current $I_4$ shown in FIG. 6(*b*). It is perhaps desirable to explain at this point that the direction of current $I_4$ will be relative to the initial orientation of the domain 93. If the domain 93 had been oriented in the opposite direction, the current $I_3$ passing through conductor 31 would not have caused any rotation. However, if current $I_3$ would have been in the direction opposite to that shown in FIG. 6(*b*) and the domain 93 has been oriented in the direction of the domains 92, a rotation would have occurred inducing a current in a direction opposite to the current $I_4$. Therefore, this read operation, as can be seen, can not only detect binary information which has a bit value of 1 but also binary information which has a bit value of zero. FIG. 6(*c*) illustrates the state of magnetization of the soft film magnetic material after the read operation has been performed.

Figure 7:
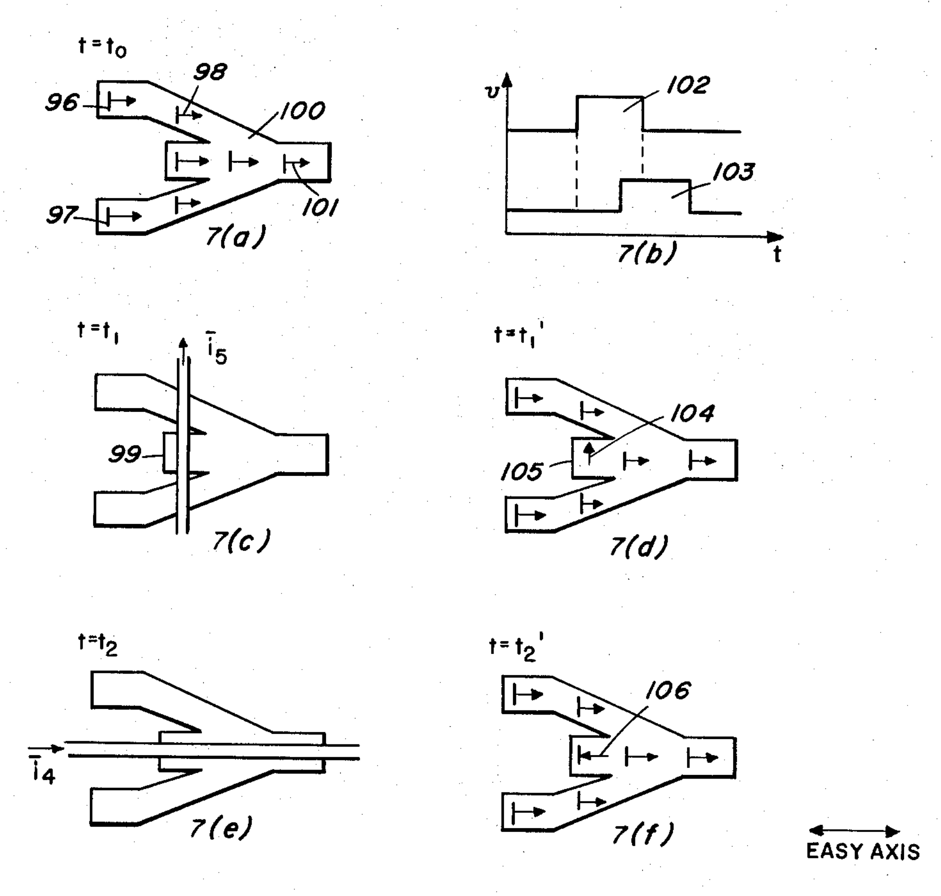
FIGS. 7(*a*)–(*f*) are schematic illustrations of the "write" operation of the invention.

FIG. 7 illustrates the write operation involved in the logic function of the thin film magnetic structure. FIG. 7(*a*) illustrates that the initial orientation of the domains within the entire thin film magnetic structure is the same and indicative of a bit having a value of zero. FIG. 7(*b*) shows the relationship in time between pulse 102 which is sent through conductor 29 of FIG. 3 and pulse 103 which is sent through conductor 32 of FIG. 3. Pulse current $I_5$ shown in FIG. 7(*c*) causes the initial state of the domain located in tab 99 to rotate so as to orientate itself in a direction perpendicular to the easy axis of the thin film magnetic material. Before pulse 102 ceases, pulse 103 is sent through conductor 32, as shown in FIG. 7(*e*), in a direction which will tend to orient the direction domain 106 takes along the easy axis of the thin film magnetic structure when the current through conductor 29 ceases. As can be seen from FIG. 7(*f*), the domain 106 assumes an orientation which is representative of a binary bit having a value of 1. The thin film magnetic logic configuration is therefore programmed to function as an OR gate.

Figure 8:
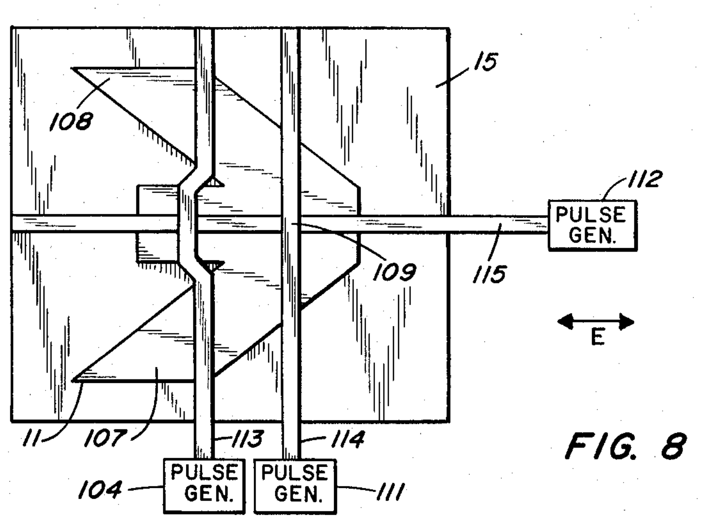
FIG. 8 is a schematic illustration of another embodiment of the invention.

Referring now to FIG. 8 which illustrates another embodiment of the invention, fewer current conductors for the shifting, reading and writing operations are required in this embodiment because of the slightly modified logic configuration 11. This embodiment may be utilized most advantageously in a situation where space is an optimum requirement and of optimum concern and the isolation provided between the input tabs 108, 107 and OR tab and the output tab 109 by conductor 30 of FIG. 3 is not desired or wanted.

As can be seen from the operation as explained with reference to FIGS. 4, 5, 6 and 7, the embodiment shown in FIG. 3 or FIG. 8 will function according to the following Truth Table.

TRUTH TABLE

| | OR TAB | A | B | C |
|---|---|---|---|---|
| | 0 | 1 | 0 | 0 |
| AND operation | 0 | 0 | 1 | 0 |
| | 0 | 1 | 1 | 1 |
| | 1 | 1 | 0 | 1 |
| | 1 | 0 | 1 | 1 |
| OR operation | 1 | 1 | 1 | 1 |
| | 1 | 0 | 0 | 0 |

Figure 9:
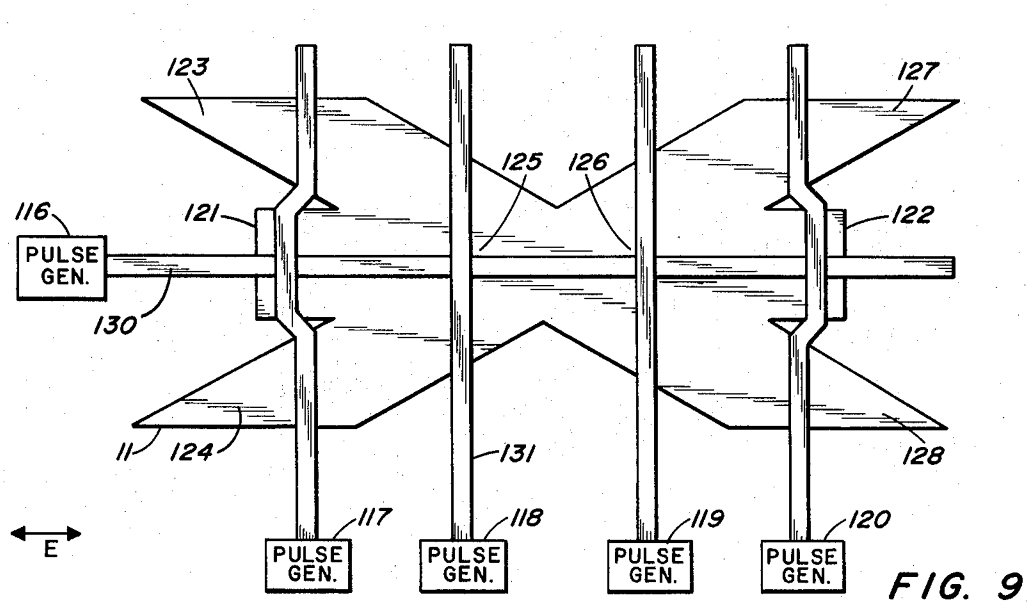
FIG. 9 illustrates still another embodiment of the invention.

Referring now to FIG. 9, another embodiment of the invention is illustrated. Two thin film logic devices of the type illustrated in FIG. 8 are connected back-to-back so that one is the mirror image of the other. The symmetry of this arrangement facilitates the shifting of data from inputs 123, 124 and OR tab 121 to inputs 127, 128 and OR tab 122 and back to inputs 123, 124 and OR tab 121 and so on in a back-and-forth fashion with various logic functions being performed at each traverse, thereby giving the same effect as if the data being operated on was shifted down a serial path comprising various logic operations. The embodiment shown in FIG. 9 may be expanded by joining together many more of the elements shown in FIG. 9 in such a manner as to make up a symmetrical matrix arrangement as shown in FIG. 10.

Figure 10:
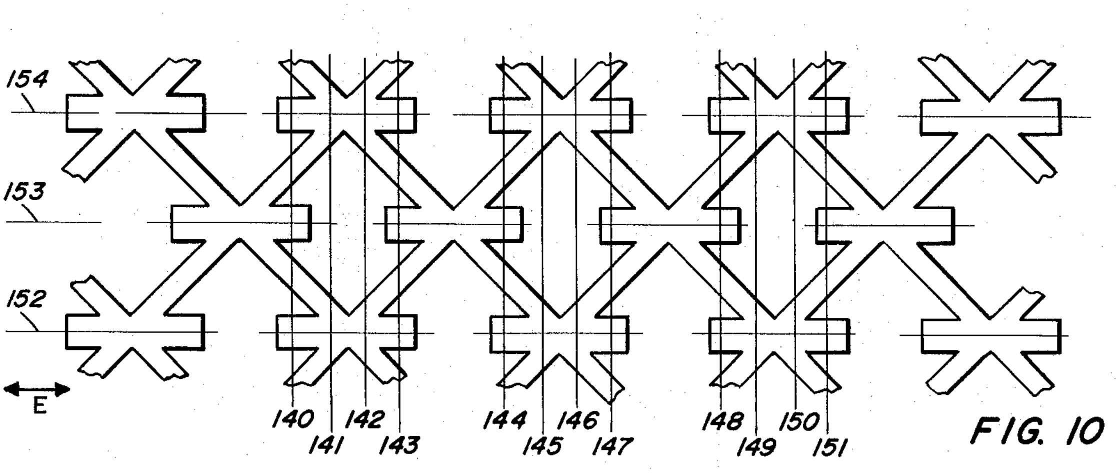
FIG. 10 is an illustration of the embodiment of this invention in which the basic principle of the previously illustrated embodiments is used as a building block for a complex logic matrix arrangement.

As can be seen, FIG. 10 shows a matrix utilizing the embodiment of FIG. 9 in which the information or data can be shifted through the matrix and back again with various and different logic operations being performed on it as it travels back and forth through the matrix. The numbered lines 140–151 and 152–154 indicate current conductors connected to appropriate equipment.

Obviously many modifications and variations of the present invention are possible in the light of the above teachings.

What is claimed is:

1. A magnetic logic device comprising a magnetic medium with an easy and a hard axis of magnetization having a low coercivity initially magnetized along its easy axis wholly in one sense of magnetization;

first input means coupled to said magnetic medium at a first predetermined place and a second predetermined place thereof for establishing a magnetic domain of the reverse sense of magnetization in said magnetic medium at said first and second or first or second perdetermined places of said medium;

second input means magnetically coupled to said magnetic medium at a third predetermined place thereof for establishing a magnetic domain of the reverse sense of magnetization in said magnetic medium;

output means responsive to state of magnetization of said magnetic medium at a fourth predetermined place thereof which is spaced from said first, second and third predetermined places by a continuous portion of said magnetic medium; and plural domain movement means magnetically coupled to said magnetic medium along said continuous portion thereof for moving any domains of the reverse sense of magnetization established at said first, second and third predetermined places thereof from said first, second and third predetermined places to said fourth predetermined place constantly in an discrete, step-by-step manner, in a predetermined direction within said continuous portion of said magnetic medium.

2. The magnetic logic device of claim 1 wherein said first input means comprises a magnetic storage unit.

3. The magnetic logic device of claim 2 in which the magnetic storage unit is structured so as to establish domains representative of digital data at said first and second or first or second predetermined places on said magnetic medium.

4. The magnetic logic device of claim 1 wherein said second input means comprises a first magnetic field producing means oriented so as to produce a magnetic field parallel to said predetermined direction of said domain travel; and a second magnetic field producing means oriented so as to produce a magnetic field perpendicular to said predetermined direction of said domain travel.

5. The magnetic logic device of claim 4 in which the second input means further comprises pulse generating means operatively associated with said first and second field producing means so as to establish a domain representative of digital data at said third predetermined place.

6. The magnetic logic device of claim 1 wherein said domain movement means comprises a plurality of conductors placed at predetermined discrete intervals along said continuous portion of said magnetic medium, said predetermined discrete intervals including the placement of said conductors adjacent to said first and second predetermined places, adjacent to said third predetermined place and adjacent to said fourth predetermined place.

7. The magnetic logic device of claim 6 wherein an electric current respectively traverses said conductors in a direction that produces a magnetic field about said respective conductor which is in an aiding relationship with the magnetic field of an adjacent domain of said reverse sense of magnetization whereby said adjacent domain is transferred along said predetermined direction within said magnetic medium.

8. The magnetic logic device of claim 7 wherein the conductor adjacent to said fourth predetermined place carries current of a magnitude sufficient to produce a domain of said reverse sense of magnetization only when aided by two adjacent domains of said reverse sense of magnetization whereby presence of a domain of said reverse sense of magnetization at said third predetermined place causes said logic device to function as an OR gate.

9. The magnetic logic device of claim 1 wherein said output means comprises:

a first magnetic field producing means magnetically coupled to said magnetic medium and oriented so as to produce a magnetic field parallel to said predetermined direction of said domain travel; and a second magnetic field producing means magnetically coupled to said magnetic medium and oriented so as to produce a magnetic field perpendicular to said predetermined direction of said domain travel.

10. The magnetic logic device of claim 9 in which said output means further comprises pulse generating and pulse sensing means operatively associated with said first and second field producing means to cause a domain contiguous to intersection of the fields of said first and second field producing means to generate a detectable magnetic field, said generated magnetic field being detected by said output means.

11. The magnetic logic device of claim 1 wherein said magnetic medium of low coercivity is bonded in a predetermined continuous pattern to a higher coercivity magnet medium, said low coercivit-magnetic material requiring a certain minimum magnetic field strength to create domains within said pattern.

12. The magnetic logic device of claim 11 in which said pattern determines the path of data travel within said magnetic logic device and comprises:

first and second data inputs at said first and second predetermined places, respectively;

a first logic input at said third predetermined place;

an output at said fourth predetermined place upon which said first and second data inputs and said logic input converge by means of continuous portions of said magnetic medium of low coercivity.

13. The magnetic logic device of claim 12 in which said pattern further comprises:

third and fourth data inputs diverging by means of continuous portions of said magnetic medium from said output; and second logic input diverging by means of a continuous portion of said magnetic medium from said output whereby said third and fourth data inputs are a mirror image of said first and second inputs and said second logic input is a mirror image of said first logic input.

14. The magnetic logic device of claim 13 in which said pattern further comprises:

said first data input structurally connected to another fourth data input;

said second data input structurally connected to another third data input which is not paired with said another fourth data input;

said third data input structurally connected to another second data input; and said fourth data input structurally connected to another first data input which is not paired with said another second data input, whereby said inputs are connected to form a symmetrical matrix arrangement of like structural logic devices to form a complex logic device.

15. The magnetic logic device of claim 11 in which said magnetic medium of low coercivity comprises soft magnetic film of a type having a uniaxial anisotropic characteristic, small remanence, small coercive forces and a small, insubstantially pronounced hysteresis loop characteristic and in which said magnetic medium of higher coercivity comprises relatively hard magnetic film of a type having a highly pronounced hysteresis loop characteristic, relatively large remanence and large coercive forces.

* * * * *